Patented Oct. 24, 1933

1,932,338

UNITED STATES PATENT OFFICE 1,932,338

PROCESS OF INHIBITING THE DEVELOPMENT OF MICROORGANISMS

Hans Finkelstein, Uerdingen, and Jakob Willems, Crefeld, Germany, assignors to I. G. Farbenindustrie Aktiengesellschaft, Frankfort-on-the-Main, Germany No Drawing. Application October 7, 1930, Serial No. 487,088, and in Germany October 17, 1929

8 Claims. (Cl. 167—31)

The present invention concerns a process of inhibiting the growth of microorganisms.

As is known, many materials, particularly those containing constituents of vegetable or animal origin, such as glue, gelatine, drawing materials, printing roller compositions, fabrics, yarns, vegetable tanning extracts, cork and the like form a favorable nutrient medium for the growth of microorganisms, such as fungi and bacteria and are consequently readily attacked by the same.

In accordance with the present invention, cyanphenols and derivatives thereof, that is compounds of the general formula

are employed, the said compounds retarding to a quite extraordinary extent or suppressing the growth of microorganisms on the above named materials. Among the derivatives of the cyanphenols are suitable the alkylated cyanphenols such as cyancresols, cyanphenol carbonic acids their esters and amides and especially the halogenated cyanphenols and cyanpolyphenols such as cyanresorcinol. Instead of the free cyanphenols and their derivatives, the alkali compounds, the ethers or the acid esters thereof can be employed.

Most of these cyanphenols are odorless and colorless. Further, what is important from a practical point of view, most of them are easily soluble in water.

The disinfecting and preserving efficacy of the cyanphenols on microorganisms is considerably high (for example the concentration at which the growth of penicillium glaucum and bacterium coli is suppressed on agar-agar nutrition amounts to 0.06–0.075). The cyanphenols also can be employed conjointly with other disinfecting agents, such as for example halogenated phenols, hydroxybenzoic-esters, formaldehyde, boric acid and the like.

The mode of application varies according to the material to be protected. Liquid materials may be incorporated with the cyanphenols as such, while solid substances are with advantage impregnated or sprinkled with the solutions of them.

The invention is further illustrated by the following examples, the parts being by weight:

*Example 1*

To 100 parts of a 25 per cent. solution of bone glue are added 0.025 parts of p-cyanphenol. The solution thus treated remains free from mildew and bacteria.

*Example 2*

Photographic gelatine is mixed with 0.1 per cent. of o-cyanphenol. Even after standing for many months no formation of fungus occurs.

*Example 3*

Solutions of glue from hides or leather waste are not attacked by putrefactive bacteria after the application thereto of 0.1 per cent. of 4-cyan-2-chlorophenol.

We claim:

1. The process of inhibiting the development of microorganisms in materials liable to decompose, which consists in applying to said material a cyanphenol in which the benzene nucleus is substituted by at least one hydroxy group and at least one cyan radicle.

2. The process of inhibiting the development of microorganisms in materials liable to decompose, which consists in applying to said material p-cyanphenol.

3. The process of inhibiting the development of microorganisms in materials liable to decompose, which consists in applying to said material o-cyanphenol.

4. The process of inhibiting the development of microorganisms in materials liable to decompose, which consists in applying to said materials 4-cyan-2-chlorophenol.

5. As a new disinfectant a cyanphenol in which the benzene nucleus is at least substituted by one hydroxy group and by at least one cyan radicle.

6. As a new disinfectant p-cyanphenol in which the benzene nucleus is at least substituted by one hydroxy group and by at least one cyan radicle.

7. As a new disinfectant o-cyanphenol in which the benzene nucleus is at least substituted by one hydroxy group and by at least one cyan radicle.

8. As a new disinfectant 4-cyan-2-chlorophenol in which the benzene nucleus is at least substituted by one hydroxy group and by at least one cyan radicle.

HANS FINKELSTEIN.
JAKOB WILLEMS.